(12) United States Patent
Peterson et al.

(10) Patent No.: US 6,646,646 B2
(45) Date of Patent: Nov. 11, 2003

(54) MEMORY SYSTEM HAVING PROGRAMMABLE MULTIPLE AND CONTINUOUS MEMORY REGIONS AND METHOD OF USE THEREOF

(75) Inventors: James R. Peterson, Portland, OR (US); William Radke, San Francisco, CA (US)

(73) Assignee: Micron Technology, Inc., Boise, ID (US)

(*) Notice: Subject to any disclaimer, the term of this patent is extended or adjusted under 35 U.S.C. 154(b) by 385 days.

(21) Appl. No.: 09/737,231

(22) Filed: Dec. 13, 2000

(65) Prior Publication Data

US 2002/0070941 A1 Jun. 13, 2002

(51) Int. Cl.$^7$ ............................................. G06F 12/02
(52) U.S. Cl. ........................ 345/543; 345/531; 711/170
(58) Field of Search ................................. 345/501–506, 345/519–520, 522, 530–574; 711/170–173, 154, 202

(56) References Cited

U.S. PATENT DOCUMENTS

| | | | | |
|---|---|---|---|---|
| 4,507,730 A | | 3/1985 | Johnson et al. | 364/200 |
| 5,357,621 A | | 10/1994 | Cox | 395/400 |
| 5,664,162 A | * | 9/1997 | Dye | 345/532 |
| 6,160,562 A | * | 12/2000 | Chin et al. | 345/520 |
| 6,252,612 B1 | | 6/2001 | Jeddeloh | 345/521 |
| 6,260,127 B1 | * | 7/2001 | Olarig et al. | 711/167 |
| 6,373,493 B1 | * | 4/2002 | Rickard et al. | 345/542 |
| 6,462,745 B1 | * | 10/2002 | Behrbaum et al. | 345/543 |

* cited by examiner

Primary Examiner—Kee M. Tung
(74) Attorney, Agent, or Firm—Dorsey & Whitney LLP (57) ABSTRACT

A memory system and method for allocating and accessing memory. The memory system includes first and second addressable memory regions coupled to a memory controller. The memory controller includes a register to store a respective offset value and values defining portions of the first and second addressable memory regions allocated to first and second logical memory spaces. A first portion of the first addressable memory region is allocated to a first requested memory space, and a second portion of the first addressable memory region is allocated to a second requested memory space. Any remaining portions of the first and second requested memory spaces are remapped to the second addressable memory region. The memory controller is adapted to access the first addressable memory region in response to receiving a memory address for a location within the first portions of the first and second memory spaces and to access the second addressable memory region in response to receiving a memory address for a location within the second portions of the first and second memory spaces.

37 Claims, 4 Drawing Sheets

MEMORY SYSTEM HAVING PROGRAMMABLE MULTIPLE AND CONTINUOUS MEMORY REGIONS AND METHOD OF USE THEREOF

TECHNICAL FIELD

The present invention is related generally to the field of computer graphics, and more particularly, to a memory system and method for use in a computer graphics processing system.

BACKGROUND OF THE INVENTION

Graphics processing systems are typically memory intensive systems, requiring a significant amount of memory to render graphics images with sufficient speed and quality. The memory appears as a contiguous memory space, but is often physically separated into various levels. For example, a graphics processing system usually includes a portion of embedded memory integrated with the other circuitry of the graphics processing system to form a single device, as well as a portion of external memory that is not integrated onto the device, but is located locally and dedicated for graphics processing. At a third level, system memory belonging to a host computer in which the graphics processing system is located may be accessed by the graphics processing system.

Generally, embedded memory included in a graphics processing system allows data to be provided to processing circuits, such as the graphics processor, the pixel engine, and the like, with low access times. The proximity of the embedded memory to the graphics processor and its dedicated purpose of storing data related to the processing of graphics information enable data to be moved throughout the graphics processing system quickly. Thus, the processing elements of the graphics processing system may retrieve, process, and provide graphics data quickly and efficiently, increasing the processing throughput. The embedded memory is used by the graphics processing system for a variety of purposes. For example, the embedded memory is often allocated for z-buffering purposes to store the depth values of graphics primitives in a three-dimensional image. Another use is as a pixel buffer to store the color values of pixels that are used for processing, or that will be rendered. Still another use is as a texture buffer to store texture map data where texture mapping is to be applied during rendering a graphics image. By allocating the embedded memory for these purposes, the overall processing speed of the graphics processing system is increased.

Allocation of the embedded memory is typically performed by the graphics application executing on the graphics processing system, and is often allocated according to a priority defined by the graphics application. That is, a portion of the embedded memory is first reserved for a primary purpose requiring a certain amount of memory, such as for z-buffering. Any remaining embedded memory is then allocated to a secondary purpose, such as for pixel buffering. If the memory requirements for the secondary purpose exceed the amount of embedded memory remaining after the allocation for the primary purpose, external memory is used to make up for any memory deficiency for the secondary purpose. Typically, the memory of the graphics processing system is first allocated for the z-buffer, then for the pixel buffer, and then for the texture buffer.

A problem that arises with the graphics application allocating memory is that memory allocation is typically made without regard to the availability of embedded memory in the graphics processing system. As a result, the embedded memory may be allocated in a fashion that reduces overall processing efficiency. For example, where allocation of memory for the z-buffer consumes a significant portion of embedded memory, it is likely that a good portion of memory allocated to the pixel buffer will consist of external memory. However, external memory generally has slower access times than embedded memory, and consequently, operations involving memory access to the pixel buffer will be relatively slower than if a greater portion of the embedded memory were allocated for the pixel buffer.

A conventional approach to resolving the previously described problem is to design graphics processing systems that include more embedded memory that may be allocated to the various uses. However, this approach increases the cost of the graphics processing system, and, where minimizing the size of the system is desired, including additional embedded memory in the graphics processing system may not be an acceptable approach.

Therefore, there is a need for a memory system and a method having the flexibility to allocate memory in a manner other than determined only by the default allocation method of a graphics application.

SUMMARY OF THE INVENTION

The present invention is directed to a memory system and a method for allocating and accessing memory. The memory system includes first and second addressable memory regions coupled to a memory controller. A first portion of the first addressable memory region is allocated to a first requested memory space, and a second portion of the first addressable memory region is allocated to a second requested memory space. Any remaining portions of the first and second requested memory spaces are remapped to the second addressable memory region. The memory controller includes a register to store a respective offset value and values defining the portions of the first and second addressable memory regions allocated to the first and second logical memory spaces. The memory controller is adapted to access the first addressable memory region in response to receiving a memory address for a location within the first portions of the first and second memory spaces and to access the second addressable memory region in response to receiving a memory address for a location within the second portions of the first and second memory spaces.

DETAILED DESCRIPTION OF THE INVENTION

Embodiments of the present invention provide a memory system that allows for the allocation of a first memory area to portions of multiple memory spaces. Each memory space has a required size and allocation of the first memory area is made according to values programmed in a register included in a memory controller. Remaining portions of the multiple memory spaces are mapped to a second memory area. The memory controller accesses the second memory area by adding an offset value to logical addresses it receives which correspond to locations in the remaining portions of the multiple memory spaces.

Certain details are set forth below to provide a sufficient understanding of the invention. However, it will be clear to one skilled in the art that the invention may be practiced without these particular details. In other instances, well-known circuits, control signals, timing protocols, and software operations have not been shown in detail in order to avoid unnecessarily obscuring the invention.

Figure 1:
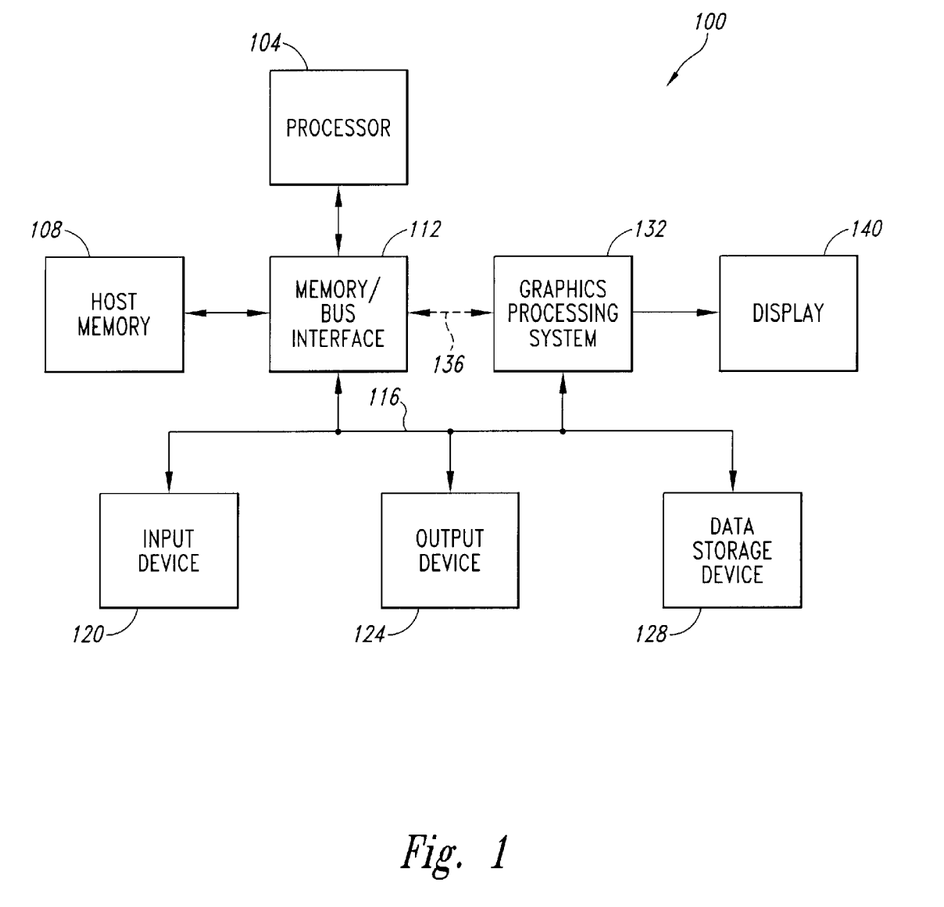
FIG. 1 is a block diagram of a computer system in which embodiments of the present invention are implemented.

FIG. 1 illustrates a computer system 100 in which embodiments of the present invention are implemented. The computer system 100 includes a processor 104 coupled to a host memory 108 through a memory/bus interface 112. The memory/bus interface 112 is coupled to an expansion bus 116, such as an industry standard architecture (ISA) bus or a peripheral component interconnect (PCI) bus. The computer system 100 also includes one or more input devices 120, such as a keypad or a mouse, coupled to the processor 104 through the expansion bus 116 and the memory/bus interface 112. The input devices 120 allow an operator or an electronic device to input data to the computer system 100. One or more output devices 120 are coupled to the processor 104 to provide output data generated by the processor 104. The output devices 124 are coupled to the processor 104 through the expansion bus 116 and memory/bus interface 112. Examples of output devices 124 include printers and a sound card driving audio speakers. One or more data storage devices 128 are coupled to the processor 104 through the memory/bus interface 112 and the expansion bus 116 to store data in, or retrieve data from, storage media (not shown). Examples of storage devices 128 and storage media include fixed disk drives, floppy disk drives, tape cassettes and compact-disc read-only memory drives.

The computer system 100 further includes a graphics processing system 132 coupled to the processor 104 through the expansion bus 116 and memory/bus interface 112. Optionally, the graphics processing system 132 may be coupled to the processor 104 and the host memory 108 through other types of architectures. For example, the graphics processing system 132 may be coupled through the memory/bus interface 112 and a high speed bus 136, such as an accelerated graphics port (AGP), to provide the graphics processing system 132 with direct memory access (DMA) to the host memory 108. That is, the high speed bus 136 and memory bus interface 112 allow the graphics processing system 132 to read and write host memory 108 without the intervention of the processor 104. Thus, data may be transferred to, and from, the host memory 108 at transfer rates much greater than over the expansion bus 116. A display 140 is coupled to the graphics processing system 132 to display graphics images. The display 140 may be any type of display, such as a cathode ray tube (CRT), a field emission display (FED), a liquid crystal display (LCD), or the like, which are commonly used for desktop computers, portable computers, and workstation or server applications.

Figure 2:
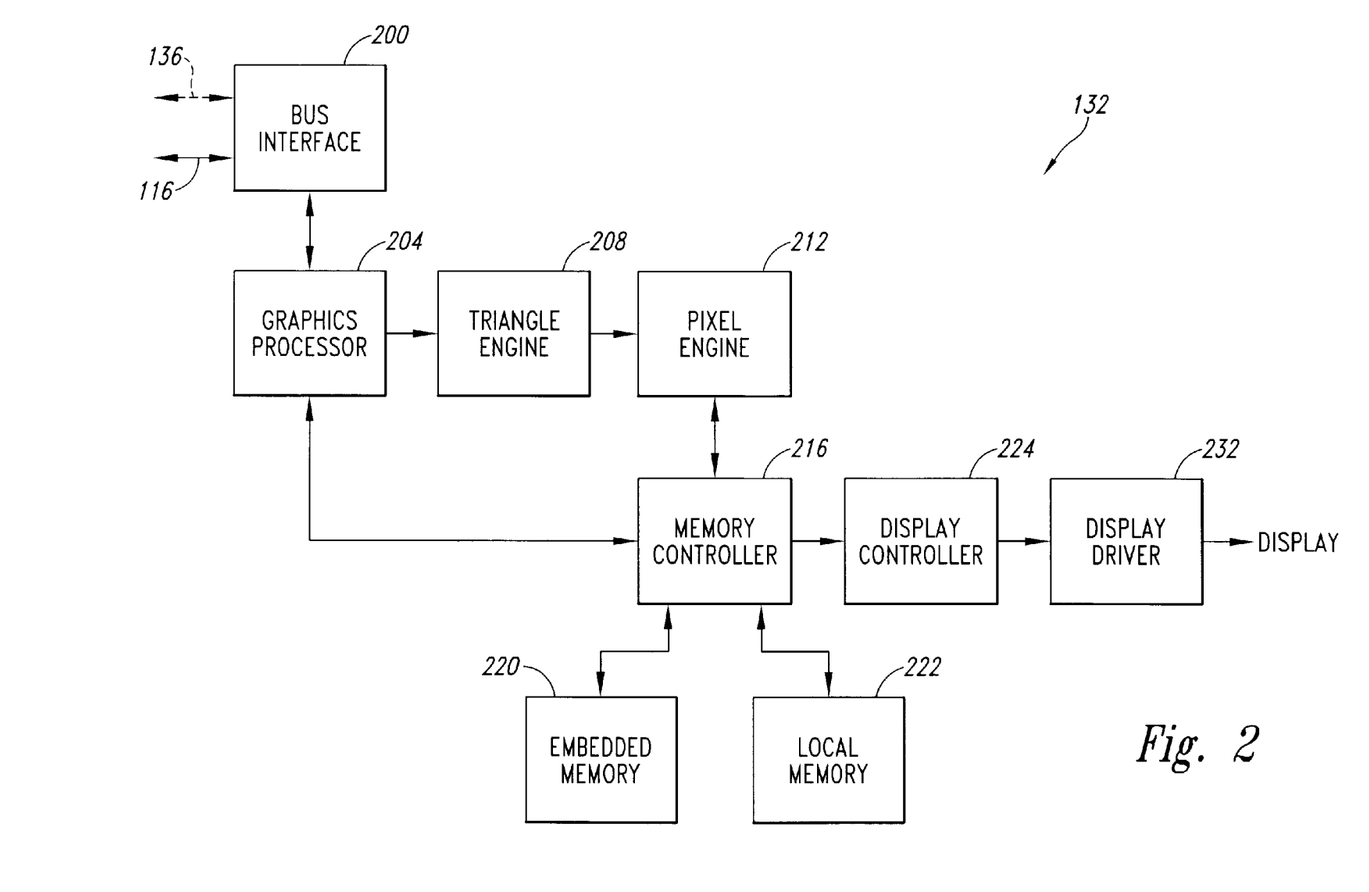
FIG. 2 is a block diagram of a graphics processing system in the computer system of FIG. 1.

FIG. 2 illustrates circuitry included within the graphics processing system 132 for performing various three-dimensional (3D) graphics functions. As shown in FIG. 2, a bus interface 200 couples the graphics processing system 132 to the expansion bus 116. In the case where the graphics processing system 132 is coupled to the processor 104 and the host memory 108 through the high speed data bus 136 and the memory/bus interface 112, the bus interface 200 will include a DMA controller (not shown) to coordinate transfer of data to and from the host memory 108 and the processor 104. A graphics processor 204 is coupled to the bus interface 200 and is designed to perform various graphics and video processing functions, such as, but not limited to, generating vertex data and performing vertex transformations for polygon graphics primitives that are used to model 3D objects. The graphics processor 204 is coupled to a triangle engine 208 that includes circuitry for performing various graphics functions, such as clipping, attribute transformations, rendering of graphics primitives, and generating texture coordinates for a texture map. A pixel engine 212 is coupled to receive the graphics data generated by the triangle engine 208. The pixel engine 212 contains circuitry for performing various graphics functions, such as, but not limited to, texture application or mapping, bilinear filtering, fog, blending, and color space conversion.

A memory controller 216 coupled to the pixel engine 212 and the graphics processor 204 handles memory requests to and from an embedded memory 220 and a local memory 222. As mentioned previously, embedded memory is typically included with the processing circuitry on the same device and generally has low access times, while local memory is memory that is not included on the same device, but is dedicated to supporting graphics processing by the graphics processing system. The embedded and local memories 220 and 222 store graphics data, such as source pixel color values and destination pixel color values. As will be discussed in more detail below, the embedded memory 220 and the local memory 222 are physically allocated by the memory controller 216 such that the embedded memory 220 may be assigned in a manner other than determined only by a graphics application executing on the host processor 104 (FIG. 1). Allocation of the memory by the embedded memory will appear logically transparent to the executing graphics application.

A display controller 224 is coupled to the memory controller 216 to receive processed destination color values for pixels that are to be rendered. The destination color values are subsequently provided to a display driver 232 that includes circuitry to provide digital color signals, or convert digital color signals to red, green, and blue analog color signals, to drive the display 140 (FIG. 1).

Figure 3:
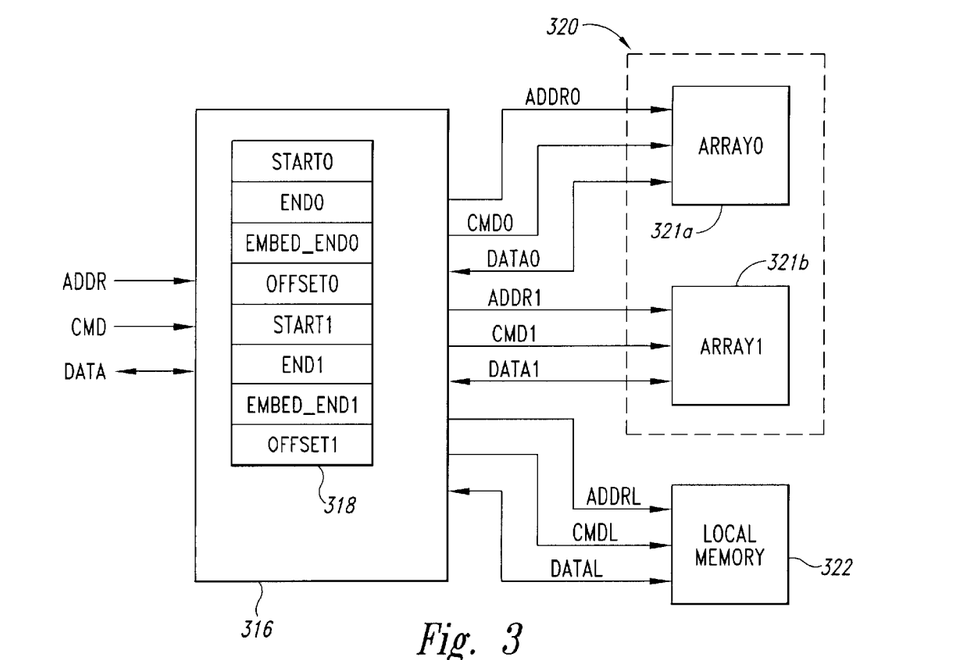
FIG. 3 is a block diagram of a portion of a memory system according to an embodiment of the present invention.

FIG. 3 illustrates a portion of a memory controller 316, embedded memory 320, and local memory 322 according to an embodiment of the present invention. The embedded memory includes two memory arrays 321a and 321b, each of which is coupled to the memory controller 316 through separate address, command, and data lines. As illustrated in FIG. 3, address signals ADDR0 and ADDR1, and command signals CMD0 and CMD1 are provided to the respective memory arrays 321a and 321b. Data signals DATA0 and DATA1 are provided to and received from the respective memory arrays 321a and 321b as well. The memory controller 316 is further coupled to provide address signals ADDRL and command signals CMDL to the local memory 322, as well as provide to and receive from data signals DATAL. It will be appreciated that the provision of the address signals and the command signals to the embedded memory 320 and the local memory 322, as well as reading and writing data are conventional, and well understood in the art. Therefore, in the interests of brevity, a more detailed description of these memory operations has been omitted. It will be further appreciated that the number of memory arrays included in the embedded memory 320 may be changed from the two illustrated in FIG. 3 without departing from the scope of the present invention. Modifying the appropriate signal lines and control circuits to change the number of arrays is well understood by those of ordinary skill in the art.

Included in the memory controller 316 is a register 318 for storing programmable values that are used by the memory controller 316 to allocate the embedded memory 320 into various regions. As illustrated in FIG. 3, the values that are stored by the register 318 for each region include a start address for the region STARTn, the total size of the region SIZEn, the embedded portion of the respective region EMBED_SIZEn, and an offset value for the region OFFSETn. The memory controller 316 evaluates the values stored by the register 318 and remaps a requested address the memory controller receives from a requesting entity to a physical memory location which is accessed.

Figure 4:
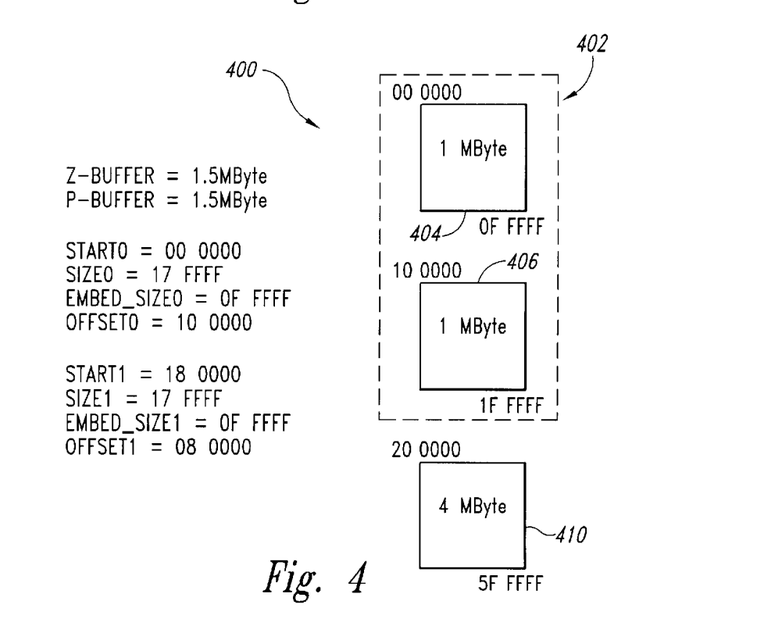
FIG. 4 is a block diagram representing operation of the memory system of FIG. 3.

FIG. 4 conceptually illustrates the operation of the embodiments of the present invention. It will be appreciated that the values used in describing the operation of the embodiments in the present example are provided merely by way of example, and should not be interpreted as limiting the scope of the present invention. As illustrated in FIG. 4, a memory system 400 of the present example includes an embedded memory 402 having two 1 Mbyte arrays of embedded memory 404 and 406. The memory system 400 further includes one 4 Mbyte region of local memory 410. In the present example, a graphics application allocates 1.5 Mbytes for the purposes of a z-buffer, and another 1.5 Mbytes for a pixel buffer. In a conventional memory system, 1.5 Mbytes of the embedded memory arrays 404 and 406 would be allocated to the z-buffer, while the remaining 0.5 Mbytes of embedded memory array 406 plus 1 Mbyte of the local memory 410 would be allocated for the pixel buffer. However, the allocation of memory made by the graphics application is made by default and does not consider whether the distribution of the embedded memory 402 in favor of the z-buffer is less efficient than a more even distribution between the z- and pixel buffers.

In contrast with the conventional memory system, embodiments of the present invention allow for the allocation of the embedded memory 402 to be programmable such that a more even distribution may be made. By programming the appropriate values into the register 318 (FIG. 3), the embedded memory 402 may be allocated as desired. For example, although the default allocation by the graphics application would result in the majority of the embedded memory 402 being allocated for z-buffering purposes, programming the values described below into the register 318 allows for the 1 Mbyte embedded memory array 404 to be allocated for the z-buffer, the 1 Mbyte embedded memory array 406 to be allocated for the pixel buffer, and the local memory 406 to make up the 0.5 Mbyte difference for both the z- and pixel buffers. To allocate the memory in this manner, the following values should be programmed into the register 318:

START0=00 0000H; START1=18 0000H;
SIZE0=17 FFFFH; SIZE1=17 FFFFH;
EMBED_SIZE0=0F FFFFH; EMBED_SIZE1=0F FFFFH;
OFFSET0=10 0000H; and OFFSET1=08 0000H.

The value START0 represents the starting address for the z-buffer in the embedded memory array 404, and START1 represents the starting address for the pixel buffer in the embedded memory array 406. The SIZE0 and SIZE1 values represent the size for the respective buffers, and EMBED_SIZE0 and EMBED_SIZE1 represent the size for the portion of the respective buffers physically located in the embedded memory 402. The OFFSET0 and OFFSET1 values represent the value that should be added to the requested address received by the memory controller 316 when accessing the portion of the z- and pixel buffers to which the local memory 410 has been allocated.

Using the values described above, the memory controller 316 will translate the requested logical address it receives from a requesting entity to a physical address corresponding to an appropriate physical memory location. That is, where the requested address is in the range:

STARTn ≦ requested address ≦ (STARTn+EMBED_SIZEn), the requested address is used as the physical address because the location of the requested address is located in the embedded memory 402. Any modifications to the requested address that should be made to access the appropriate portion of the embedded memory 402 will be made by the memory controller. However, where the requested address is in the range:

(STARTn+EMBED_SIZEn) < requested address ≦ (STARTn+SIZEn), the OFFSETn value will be added by the memory controller 316 to the requested logical address to calculate the physical address for the portion of the buffer that is located in the local memory 410.

For example, if the requested address received by the memory controller 316 is 0C 0000H, the memory controller 316 uses the requested address as the physical address to access the embedded memory array 404 because the requested address is in the range:

00 0000H ≦ (requested address=0C 0000H) ≦ (00 0000H+0F FFFFH).

The requested address is within the range of the z-buffer that is included within the embedded memory array 404. However, if the requested address received by the memory controller 316 is 11 0000H, the memory controller 316 determines from the range:

(00 0000H+0F FFFFH) < (requested address=11 0000H) ≦ (00 0000H+17 0000H)

that the offset value OFFSET0 will need to be added to the requested logical address to produce the physical memory address that should be accessed by the memory controller 316. Using the values from above:

physical address=11 0000H+10 0000H=21 0000H.

Thus, in response to receiving the requested logical address 11 0000H, the memory controller will access the memory location corresponding to 21 0000H, which is located in the local memory 410. Access to a location in the pixel buffer will be processed in a manner similar to that described above. That is, the requested address is received by the memory controller 316 and the determination of whether to add the offset value will be made based on the start, size, and embedded memory size values for the pixel buffer that are programmed into the register 318. Where the requested address received by the memory controller falls within the range of the portion of the pixel buffer included in the embedded memory, the appropriate location in the embedded memory 404 is accessed. However, addresses falling outside of the embedded range are translated to a corresponding physical memory address in the local memory 410.

It will be appreciated that some of the values described as being stored in the register 318 may be substituted with other values. For example, embodiments of the invention have been previously described as including the size of a region, and the size of the embedded portion of the region. However, storing the address representing the end of a region and the address representing the end of embedded portion of the region may be substituted for these values without departing from the scope of the present invention. Moreover, which values that are stored in the register 318 may be increased or reduced as necessary of minor modifications to the memory system illustrated in FIG. 3. Therefore, the scope of the present invention is not limited by the particular types of values stored by the register 318 except as recited in the appended claims.

Figure 5:
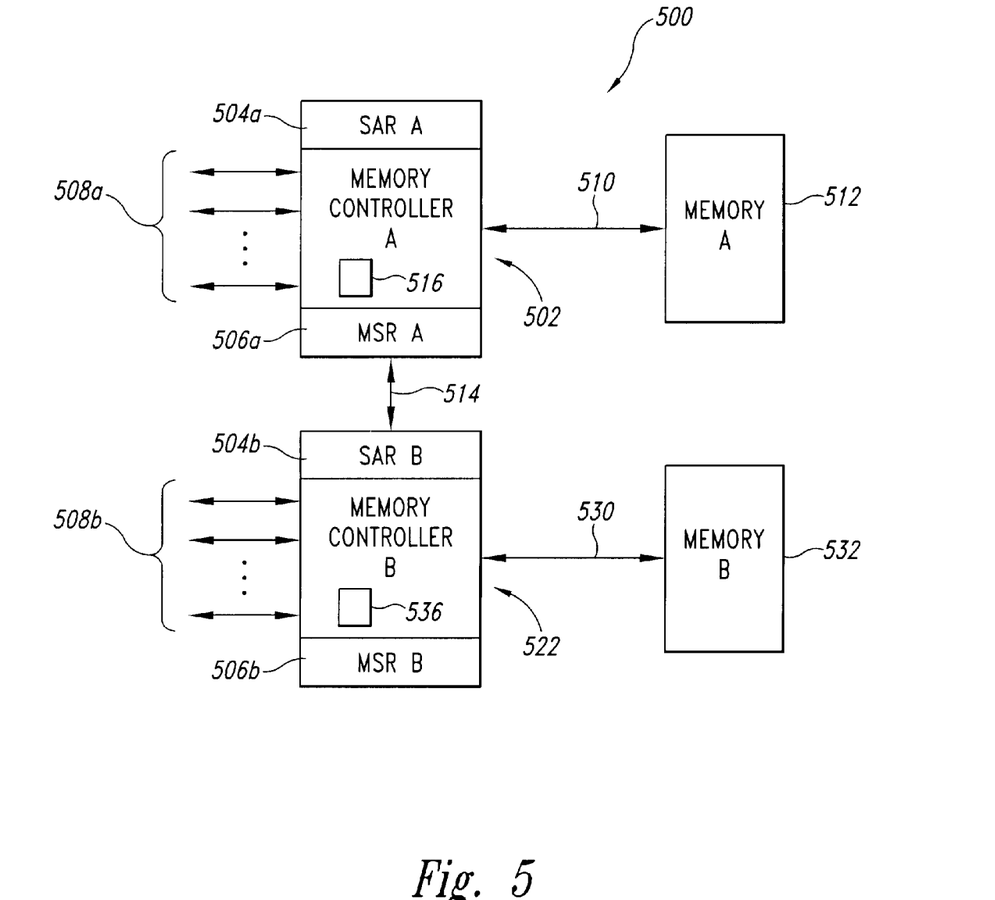
FIG. 5 is a block diagram of a memory system having a distributed memory controller arrangement.

FIG. 5 illustrates a distributed memory controller memory subsystem 500 that may be substituted into a graphics processing system. A more detailed description of a similar memory subsystem is provided in patent application Ser. No. 09/603,158, filed Jun. 23, 2000, which is incorporated herein by reference. To summarize, the memory subsystem 500 includes two memory controllers 502 and 522 coupled together through memory controller bus 514. The memory controller bus 514 allows memory access requests, as well as data, to be passed between the two memory controllers 502 and 522. Each of the memory controllers 502 and 522 is coupled to an addressable memory area 512 and 532, respectively, that is defined by two values. The two values are stored in registers 504$a$–$b$ and 506$a$–$b$. Registers 504$a$ and 506$a$ of the memory controller 502 store the start address and memory size for the addressable memory area 512, and registers 504$b$ and 506$b$ of the memory controller 522 store the start address and memory size value for the addressable memory area 532. These values are referenced by the respective memory controller to determine whether a memory access request is to a memory location in the addressable memory area to which the memory controller is coupled.

For example, the arrangement of the memory subsystem 500 allows a memory access request made to the memory controller 502 over request lines 508 to be passed to the memory controller 522 when the requested memory location has a memory address located in the addressable memory area 532. As mentioned previously, the memory controller receiving the memory access request can determine whether the requested address is located within the addressable memory area to which it is coupled by checking the values of the start address and memory size. In the present example, the memory controller 522 receives the memory access request from the memory controller 502, and accesses the addressable memory area 532 to service the memory access request. If the memory access request received by the memory controller 502 is a read command, the memory controller 522 reads the data from the requested memory location and provides the data back to the memory controller that originally received the memory access request, namely, the memory controller 502. If the memory access request was a write command, data to be written to the memory location accompanies the memory access request that is passed from the memory controller that originally received the memory access request.

An embodiment of the present invention implements the memory controller and memory described with respect to FIG. 3 in a memory system having a distributed memory controller arrangement similar to that shown in and described with respect to FIG. 5. As illustrated in FIG. 5, the memory controllers 502 and 522 further include registers 516 and 536, respectively, for storing values that are used to allocate the addressable memory areas 512 and 532. Operation of the memory controllers 502 and 522 is similar to the operation of the memory controller 316, the embedded memory 320, and the local memory 322 (FIG. 3). That is, the addressable memory areas 512 and 532 are allocated according to the values programmed into the respective registers 516 and 536 such that portions of memory are physically allocated in a manner different than the default logical allocation made by the graphics application. The memory space, however, will appear continuous to the graphics application, and accessing the appropriate physical memory location will appear transparent. For example, the registers 516 and 536 may be programmed with values as previously described to allocate the memory of addressable memory area 512 for two different purposes, such as for a z-buffer and a pixel buffer, and then use the addressable memory area 532 for any remaining memory deficiencies. This is in contrast with a conventional memory system that would allocate the memory of addressable memory space 512 initially to the z-buffer, and any remaining memory to the pixel buffer, without considering whether an more even distribution of the addressable memory space 512 between the two buffers would result in more efficient graphics processing.

It will be appreciated that the addressable memory areas 512 and 532 illustrated in FIG. 5 may represent various types of memory, such as embedded memory, local memory, or host memory. Thus, the particular type of memory included in the memory system 500 should not be interpreted as limiting the scope of the present invention. It will be further appreciated that additional memory controllers may be coupled to the memory controllers 502 and 522 through a memory controller bus to extend the memory space to may be allocated.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method of allocating and accessing a memory having first and second addressable memory regions, the method comprising:

separating logical memory addresses of first and second allocated memory spaces into first and second portions;

allocating the first portions of the first and second memory spaces to the first addressable memory region and allocating the second portions of the first and second memory spaces to the second addressable memory region; and remapping memory access requests to the second portion of the first and second memory spaces to the second addressable memory region.

2. The method of claim 1, further comprising storing values defining the first and second portions of the first and second memory spaces.

3. The method of claim 1 wherein separating logical memory addresses comprises allocating the memory of the first addressable memory region to the first portions of the first and second allocated memory spaces an allocating any remainder of the first and second allocated memory spaces to the second addressable memory region.

4. The method of claim 1 wherein the first addressable memory region comprises first and second embedded memory arrays.

5. The method of claim 4 wherein allocating the first portions of the first and second memory spaces comprises allocating the first embedded memory array to the first portion of the first memory space and the second embedded memory array to the first portion of the second memory space.

6. The method of claim 1 wherein remapping memory access requests comprises adding an offset value to a requested address and accessing the memory location of the resulting address.

7. The method of claim 1 wherein the first portions of the first and second allocated memory spaces are defined by a start address value, a size value, and an embedded size value.

8. A method of allocating memory having first and second addressable memory regions that are logically contiguous, the method comprising:
   allocating a first portion of the first addressable memory region to a first requested memory space, and a second portion of the first addressable memory region to a second requested memory space; and
   mapping any remaining portions of the first and second requested memory space to the second addressable memory region.

9. The method of claim 8, further comprising storing values defining the first and remaining portions of the first and second requested memory spaces.

10. The method of claim 8 wherein the first addressable memory region comprises first and second embedded memory arrays.

11. The method of claim 10 wherein allocating the portions of the first memory space comprises allocating the first embedded memory array to the first requested memory space and the second embedded memory array to the second requested memory space.

12. The method of claim 8 wherein mapping any remaining portions comprises adding an offset value to a requested address and accessing the memory location of the resulting address.

13. The method of claim 8 wherein allocating portions of the first addressable memory region comprises storing a start address value, a size value, and an embedded size value for the first and second requested memory spaces.

14. A memory sub-system for a graphics processing system, comprising:
   first and second addressable memory regions; and
   a memory controller coupled to the first and second addressable memory regions and having a register to store for first and second logical memory spaces a respective offset value and values defining first and second portions for the respective memory space, the memory controller adapted to access the first addressable memory region in response to receiving a memory address for a location within the first portions of the first and second memory spaces and to access the second addressable memory region in response to receiving a memory address for a location within the second portions of the first and second memory spaces.

15. The memory sub-system of claim 14 wherein the first addressable memory comprises an embedded memory included in the graphics processing system.

16. The memory sub-system of claim 15 wherein the embedded memory comprises first and second embedded memory arrays.

17. The memory sub-system of claim 14 wherein the values defining the first and second portions for the respective memory space stored by the register comprise a start address, a size address, a size value, and an embedded size value.

18. The memory sub-system of claim 14, further comprising a third addressable memory coupled to the memory controller.

19. A memory sub-system for a graphics processing system, comprising:
   first and second addressable memory regions;
   a register to store values defining first and second portions of a first memory space and first and second portions of a second memory space, and an offset value for each memory space; and
   a memory controller coupled to the register and to the first and second addressable memory regions, the memory controller adapted to access the first and second addressable memory regions and in response to receiving a requested memory address corresponding to a logical memory address in the second portion of the first or second memory spaces, add the respective offset value to the requested memory address and access the resulting memory location.

20. The memory sub-system of claim 19 wherein the first addressable memory comprises an embedded memory included in the graphics processing system.

21. The memory sub-system of claim 20 wherein the embedded memory comprises first and second embedded memory arrays.

22. The memory sub-system of claim 19 wherein the values stored by the register comprise a start address, a size value, and an embedded size value.

23. The memory sub-system of claim 19, further comprising a third addressable memory coupled to the memory controller.

24. A memory system for storing graphics data in a computer graphics processing system, comprising:
   a plurality of memory arrays having memory locations corresponding to memory addresses;
   a register to store values defining allocation of the plurality of memory arrays to first and second portions of a first memory space and first and second portions of a second memory space, the register further storing an offset value for each memory space; and
   a plurality of memory controllers corresponding to the plurality of memory arrays, each memory controller coupled to a memory controller bus on which memory addresses can be passed from one memory controller to the other and coupled to query the register for the stored values, each memory controller further coupled to a respective memory array and adapted to add in response to receiving a requested memory address corresponding to a logical memory address in the second portion of the first or second memory spaces a respective offset value to the requested memory address and provide the resulting address to the memory controller coupled to the memory array including the memory location corresponding to the resulting address.

25. The memory system of claim 24 wherein the plurality of memory arrays comprises at least two embedded memory arrays included in the graphics processing system.

26. The memory system of claim 24 wherein the values stored by the register for each memory array comprise a start address, a size value, and an embedded size value.

27. The memory system of c aim 24 wherein the plurality of memory arrays comprises first and second embedded memory arrays, and a local memory array, the register having values defining the allocation of the first embedded memory array to the first portion of the first memory space, the second embedded memory array to the first portions of the second memory space, and the local memory array to the second portions of the first and second memory spaces.

28. A graphics processing system, comprising:
   a bus interface for coupling to a system bus;

a graphics processor coupled to the bus interface to process graphics data;

address and data busses coupled to the graphics processor to transfer address and graphics data to and from the graphics processor;

display logic coupled to the data bus to drive a display;

a memory request bus coupled to the data bus to drive a display; access requests; and a memory system coupled to the data bus to store and retrieve data, the memory system comprising:

first and second addressable memory regions; and a memory controller coupled to the first and second addressable memory regions and having a register to store for first and second logical memory spaces a respective offset value and values defining first and second portions for the respective memory space, the memory controller adapted to access the first addressable memory region in response to receiving a memory address for a location within the first portions of the first and second memory spaces and to access the second addressable memory region in response to receiving a memory address for a location within the second portions of the first and second memory spaces.

29. The graphics processing system of claim 28 wherein the first addressable memory comprises an embedded memory included in the graphics processing system.

30. The graphics processing system of claim 29 wherein the embedded memory comprises first and second embedded memory arrays.

31. The graphics processing system of claim 28 wherein the values defining the first and second portions for the respective memory space stored by the register comprise a start address, a size value, and an embedded size value.

32. The graphics processing system of claim 28, further comprising a third addressable memory coupled to the memory controller.

33. A computer system, comprising:

a system processor;

a system bus coupled to the system processor;

a system memory coupled to the system bus; and a graphics processing system coupled to the system bus, the graphics processing system, comprising:

a bus interface for coupling to the system us;

a graphics processor coupled to the bus interface to process graphics data;

address and data busses coupled to th graphics processor to transfer address and graphics data to and from the graphics processor;

display logic coupled to the data bus to drive a display;

a memory request bus coupled to the graphics processor to transfer memory access requests; and     a memory system coupled to the data bus to store and retrieve data, the memory system comprising:

first and second addressable memory regions; and         a memory controller coupled to he first and second addressable memory regions and having a register to store for first and second logical memory spaces a respective offset value and values defining first and second portions for the respective memory space, the memory controller adapted to access the first addressable memory region in response to receiving a memory address for a location within the first portions of the first and second memory spaces and to access the second addressable memory region in response to receiving a memory address for a location within the second portions of the first and second memory spaces.

34. The computer system of claim 33 wherein the first addressable memory comprises an embedded memory included in the graphics processing system.

35. The computer system of claim 34 wherein the embedded memory comprises first and second embedded memory arrays.

36. The computer system of claim 33 wherein the values defining the first and second portions for the respective memory space stored by the register comprise a start address, a size value, and embedded size value.

37. The computer system of claim 33, further comprising a third addressable memory coupled to the memory controller.

* * * * *

UNITED STATES PATENT AND TRADEMARK OFFICE
CERTIFICATE OF CORRECTION

PATENT NO.    : 6,646,646 B2
DATED         : November 11, 2003
INVENTOR(S)   : James R. Peterson and William Radke It is certified that error appears in the above-identified patent and that said Letters Patent is hereby corrected as shown below:

Column 4,
Line 62, "interests of" should read -- interest of --

Column 7,
Line 17, "through memory" should read -- through a memory --

Column 8,
Line 16, "whether an more" should read -- whether a more --
Line 29, "space to may be" should read -- space to be --
Line 56, "spaces an allocating" should read -- spaces and allocating --

Column 9,
Line 61, "address, a size address, a size value," should read -- address, a size value, --

Column 10,
Line 58, "c aim 24" should read -- claim 24 --

Column 11,
Lines 7 & 8, "the data bus to drive a display; access requests; and" should read -- the graphics processor to transfer memory access requests; and --

Column 12,
Line 3, "system us" should read -- system bus --
Line 16, "to he first" should read -- to the first --

Signed and Sealed this

Thirteenth Day of July, 2004

JON W. DUDAS
*Acting Director of the United States Patent and Trademark Office*